US006898989B2

(12) United States Patent
Norling et al.

(10) Patent No.: US 6,898,989 B2
(45) Date of Patent: May 31, 2005

(54) LOAD CELL

(75) Inventors: Fredrik Norling, Västerås (SE); Åke Persson, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 10/169,364

(22) PCT Filed: Dec. 1, 2000

(86) PCT No.: PCT/SE00/02405

§ 371 (c)(1),
(2), (4) Date: Aug. 28, 2002

(87) PCT Pub. No.: WO01/40749

PCT Pub. Date: Jun. 7, 2001

(65) Prior Publication Data

US 2003/0131672 A1 Jul. 17, 2003

(30) Foreign Application Priority Data

Dec. 3, 1999 (SE) ................................................ 9904393

(51) Int. Cl.[7] .............................. G01L 1/04; G01L 1/22
(52) U.S. Cl. ............................ 73/862.637; 73/862.636; 73/862.632
(58) Field of Search ................... 73/862.637, 862.636, 73/862.638, 862.621, 862.625, 862.626, 862.627, 862.629, 862.632, 862.633

(56) References Cited

U.S. PATENT DOCUMENTS 3,004,231 A  * 10/1961  Laimins ................. 73/862.633
3,135,112 A  *  6/1964  Farley ................... 73/862.382
3,161,046 A  * 12/1964  Farley ................... 73/862.622
3,602,866 A  *  8/1971  Saxl ...................... 73/862.626
3,736,795 A     6/1973  Andersson
4,450,922 A     5/1984  Alexander
4,600,066 A  *  7/1986  Griffen et al. ......... 73/862.633
4,739,848 A  *  4/1988  Tulloch ................. 73/862.633
5,293,007 A     3/1994  Darst et al.
6,220,105 B1 *  4/2001  Cripe ..................... 73/862.69

* cited by examiner

*Primary Examiner*—Edward Lefkowitz
*Assistant Examiner*—Lilybett Martir
(74) *Attorney, Agent, or Firm*—Dykema Gossett PLLC

(57) ABSTRACT

A load cell comprising a load carrying structural framework is arranged with at least one measuring zone (15, 16) arranged with a measuring means. A load F applied in the x-direction parallel to two outer beams (1, 4) of the framework is transferred to two inner beams (2, 3) by two side beams (5, 6). The load on the measuring zones (15, 16) is greater than the load applied parallel to outer beams (1, 4) in a ratio of the distance h between the joints of the two outer beams divided by the distance d between the joints of the two inner beams. When a load is applied in the y-direction parallel to the two side beams (5, 6), the load on the measuring zones is also greater than the load applied at the side beams, in this case by a ratio of the distance l between the joints (7 and 11), (10 and 14) divided by distance d. In a load cell according to the preferred embodiment of the invention measuring zones (315, 316) are defined by recesses 330–337 and planar gaps 317–319 running from one side of the load cell to the other in the z-direction. The load cell according to the invention is accurate even with small loads and is insensitive to the effects of temperature gradients across the load cell in the x, y, or z-direction.

17 Claims, 3 Drawing Sheets

LOAD CELL

TECHNICAL FIELD

The present invention relates to a measurement of force for industrial applications, and more particularly to load cells for continuous measurement of forces associated with weight or pressure, including the measurement of tension in web or sheet materials.

BACKGROUND ART

Within many industrial areas it is necessary to measure accurately the magnitude of a force. An example of a load cell for the measurement of a force in a horizontal direction is known.

A load cell described in U.S. Pat. No. 5,250,762 is arranged with two parallel beam. The two parallel beams are joined by side beams, making up a four sided frame, and the two parallel beams are also joined by one or more measuring zones. As a result of a load F applied to the load cell in a direction parallel to the two parallel beams, a shear force is applied to the one or more measuring zones joining the two parallel beams. The shear force in the measuring zones is measured by a magnetoelastic sensor of the Pressductor type.

This load cell has a long service life, tolerates overloads well and performs accurately in service. However, this load cell requires a certain minimum load in order to generate a useable measurement signal.

SUMMARY OF THE INVENTION

The objects of the invention include that of providing a load cell that accurately measures an applied load. A further object of the invention is to accurately measure a component of a load when such a load component is parallel to an outer beam of the load cell. A still further object of the invention is to provide a load cell that measures small loads accurately. Another object of the invention is to provide a load cell in which the effects of temperature gradients across the load cell are minimised. Another further object is to minimise the influence on the load cell from any load other than the measured load. The objects also include that of providing a load cell that produces measurement signal with a high output level at small loads, compared to the prior art.

A load cell according to the invention comprises a structural load-carrying framework of beams and joints arranged with one or more measuring zones. The structural load-carrying framework is arranged so that a load applied to an outer beam of the framework is transferred to a second and outer beam via two side beams, which side beams are also connected to two inner beams which are further connected to each other by at least one measuring zone.

The structural load-carrying framework can instead be loaded by means of one of the side beams, in which case the load is transferred to the second side beam via the outer and inner beams.

A load cell according to a preferred embodiment of the present invention is shaped externally as a solid and substantially rectangular block. Inside the substantially rectangular block the load cell is further shaped such that the load applied in an x-direction parallel to two substantially parallel outer beams of the load cell is transferred and amplified by two side beams connecting the outer beams to two substantially parallel inner beams, which inner beams are connected together by two measuring zones on each of which a measuring means is arranged. Each of the measuring zones equipped with measuring means is subjected to a shear load in the direction of the long axis of the load cell. The load transferred to the two measuring zones is greater than the external load on the outer part of the load cell. Through this type of leverage action relatively small loads may be measured accurately. The leverage or amplification of the applied force, when the force is applied in the x-direction parallel to the two outer beams oriented in the long axis of the load cell, is in proportion to the ratio of the distance h between the outer beams, divided by the distance d between the inner beams. More specifically h is the distance between joints 7 and 10, 11 and 14 of the outer beams 1, 4, and d is the distance between the joints 8 and 9, 12 and 13 of the inner beams 2, 3.

In case where the applied load is applied to the side beams (5, 6) in a y-direction parallel to the side beams, the leverage or amplification is in proportion to a ratio of the dimension 1, the length of the outer beams 1, 4 as defined by the distance between joints 7 and 11, 10 and 14, divided by the distance d between the joints 8 and 9, 12 and 13 of the inner beams 2, 3.

A measuring means is arranged on each measuring zone to generate a signal proportional to the mechanical strain imposed on the measuring zone. A preferred embodiment of the invention comprises two measuring areas where a measuring signal is taken from a measuring zone arranged on each area. The advantage of the present invention is that leverage or amplification due to the shape and geometry of the load cell makes it sensitive to small loads. As a result of that, a signal with a high output level is achieved for a relatively small load applied to the load cell, in comparison to the prior art. By this means, a useable signal is produced under small loads.

Another advantage is that the two beams arranged with measuring zones are joined and arranged with a geometry that makes the load cell relatively insensitive to a temperature gradient in the x-direction. This is because that temperature gradient results in stresses in the y-direction on the measuring zones, and the measuring zones are insensitive to stresses in that direction. The load cell is also insensitive to a temperature gradient in the y-direction. This is because that temperature gradient gives rise to shear forces over the measuring zones. These shear forces would, however, be opposite in sign and thereby be cancelled electrically in the output signals from measuring means arranged on the two measuring zones. A temperature gradient in the z-direction produces no effect on measuring zones that are located symmetrically in the load cell.

A still further advantage of the invention is that deformation under load is extremely small. A yet still further advantage includes that a given size of load cell according to the invention may thus be used to measure a wider range of loads by selecting suitable ratios of the quotient h/d, or by selecting a suitable ratio of l/d. An additional further advantage of the invention is that the shape and geometry makes the load cell insensitive to loads perpendicular to the measured load.

BRIEF DESCRIPTION OF THE DRAWINGS

The present invention will be described in more detail in connection with the enclosed drawings.

DESCRIPTION OF THE PREFERRED EMBODIMENTS

Figure 1:
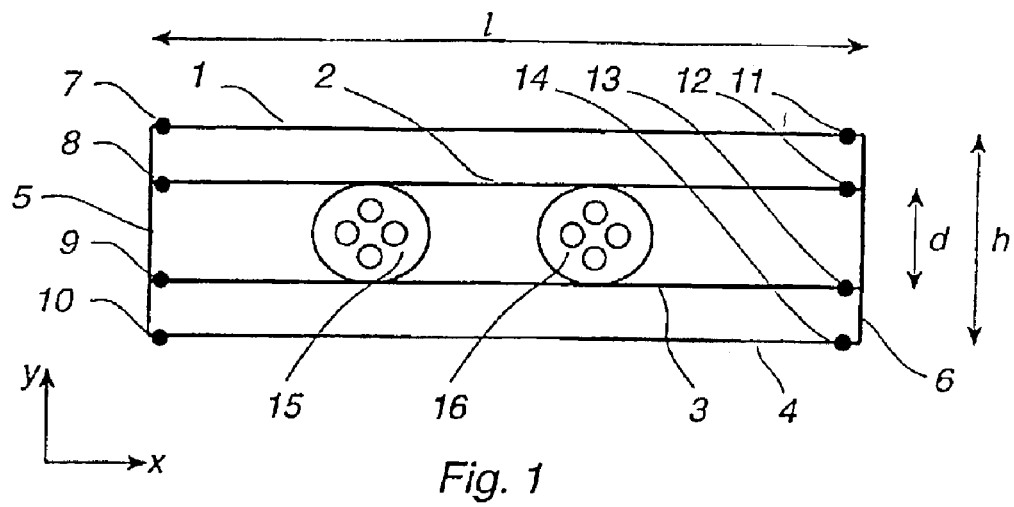
FIG. 1 shows a load cell comprising a framework according to an embodiment of the present invention.

FIG. 1 shows a load cell comprising a framework according to the present invention. The framework is represented by beams shown as thick lines and joints drawn as solid circles. The framework comprises beams 1–6 and joints 7–14. There are two outer beams 1, 4. The two outer beams 1, 4 are connected to two inner beams 2, 3 by side beams 5, 6 representing the sides of the framework. Inner beams 2, 3 are connected to each other by measuring zones 15, 16 equipped with measuring means. An arrow showing an x-direction and a y-direction relative to the framework are included in FIG. 1.

Figure 2A:
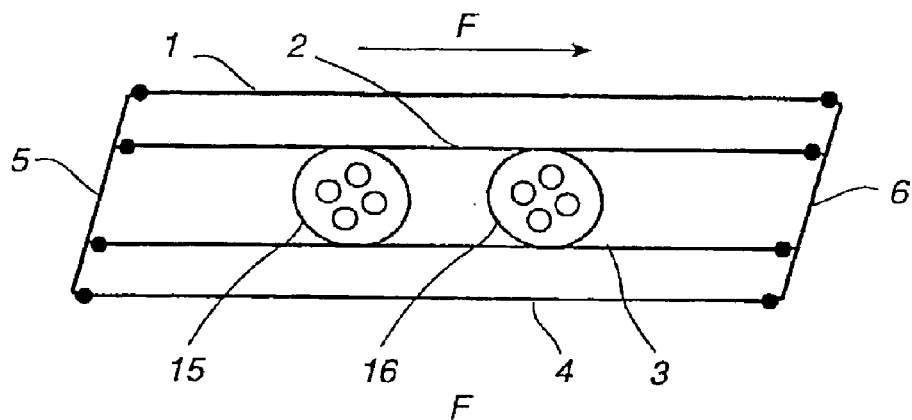
FIG. 2a shows a load cell comprising a framework according to an embodiment of the present invention under a load applied in an x-direction.

FIG. 2a shows the same load cell as shown in FIG. 1 comprising a framework according to the present invention but under a load F, a load applied to the outer beams in an x-direction. The two measuring zones 15, 16 are each subjected to a shear force as inner beams 2, 3 move apart from each other in the x-direction because of the load F. The magnitude of the shear force in the measuring zones is amplified by a type of leverage effect. The amount of amplification varies according to the ratio of the distance h between the two outer beams divided by the distance d between the two inner beams. More specifically the distances may be described as the distance h between joints 7 and 10, 11 and 14 of the outer beams 1, 4, relative to the distance d between the joints 8 and 9, 12 and 13 of the inner beams 2, 3.

A load F applied in the x-direction parallel to the outer beams 1, 4 results in a force over the measuring zones equal to $$F*k*h/d$$

where h and d are as described above.

k is a constant which is due to the non-ideal nature of the joints which have a stiffness.

Thus the ratio of h/d determines the amplification in the measuring areas of a load F applied in the x-direction parallel to the outer beams 1, 4.

Figure 2B:
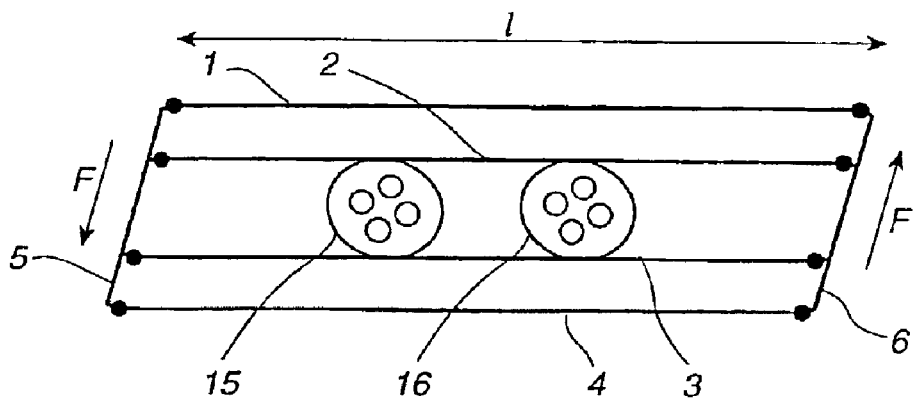
FIG. 2b shows a load cell comprising a framework according to an embodiment of the present invention under a load applied in a y-direction.

FIG. 2b shows the same load cell as shown in FIGS. 1 and 2a comprising a framework according to the present invention but under a load F, a load applied in a y-direction parallel to the side beams. The load cell under loading in the y-direction has the same form and mechanical characteristics in every way as FIGS. 1, 2a and as embodiments shown in FIGS. 3–8 with the single exception that a load F applied parallel to the side beams 5, 6, results in a force over the measuring zones equal to $$F*k*l/d$$

where l is distance between the joints 7 and 11, 10 and 14 of the outer beams and where d and k are as previously described.

Figure 3:
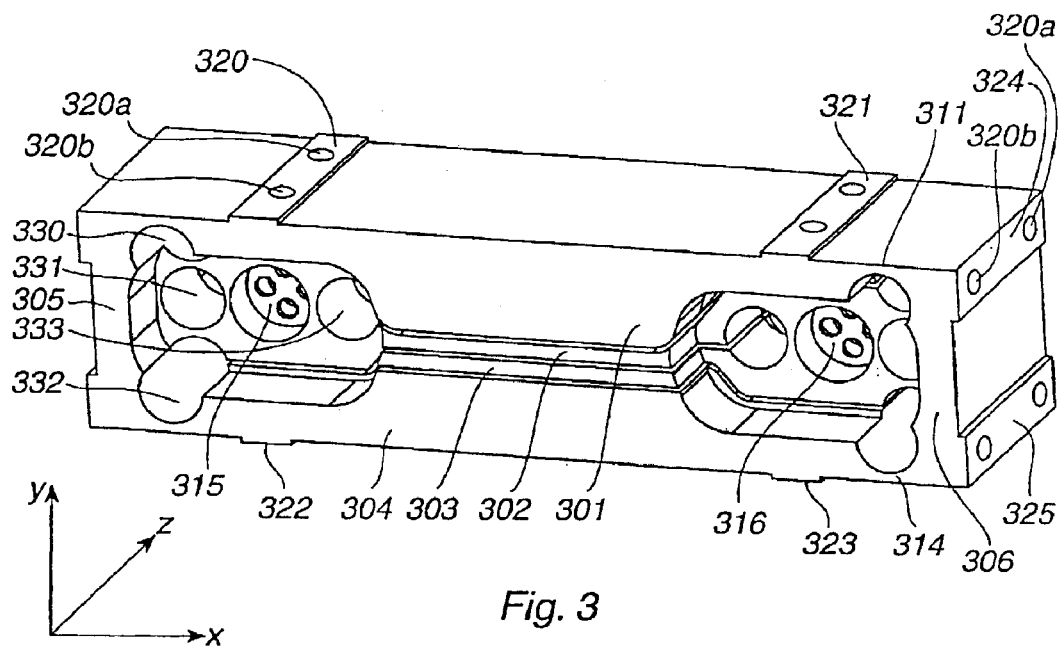
FIG. 3 shows an isometric view of a load cell according to an embodiment of the invention which is formed from a rectangular block.

FIG. 3 shows an isometric view of a load cell according to a preferred embodiment of the invention. The load cell of FIG. 3 is a substantially rectangular shaped block that corresponds to the load cell comprising the framework shown in FIGS. 1, 2a, 2b. The perpendicular axial directions x, y and z referred to in this description relative to the load cell are indicated in FIG. 3.

In FIG. 3 two outer beams 301, 304 are indicated which correspond to outer beams 1, 4 of FIG. 1. Similarly numbered are inner beams 302, 303 and measuring zones 315, 316 which correspond to inner beams 2, 3 and measuring zones 15, 16 of FIG. 1. Similarly joints 311 and 314 correspond to joints 11 and 14 of FIG. 1. In addition, two shoulders 320, 321 and 322, 323 are shown on each of the outer beams, and two more shoulders are mounted on each of the side beams 305, 306.

The elements of the load cell according to the preferred embodiment are shown in detail in FIG. 3. The load cell is shaped internally such that it comprises two measuring zones corresponding to 15, 16 of FIGS. 1, 2a, 2b arranged with measuring means. The measuring zones 315, 316 are defined in the solid material of the load cell by planar gaps 317, 318, 319, and recesses 330–337 that define the two inner beams. The planar gaps run through the solid material of the load cell in the z-direction. The recesses such as 335, 337 are shaped so as to form a narrowing or waist in a beam such as 301, 304 which has the function of forming a joint, shown numbered as 311, 314 in FIG. 3, equivalent to joints such as 11, 14 in FIG. 1. The recesses are conveniently formed from cylindrical holes bored through the solid material of the load cell in the z-direction from one side of the load cell to the other. In the present invention a recess is a cavity in, or a cut-out from, the solid material of a beam. Such a recess runs completely through the cross section of the beam in the z-direction. In the preferred embodiment the recesses have a partially semi-circular cross section.

Figure 7:
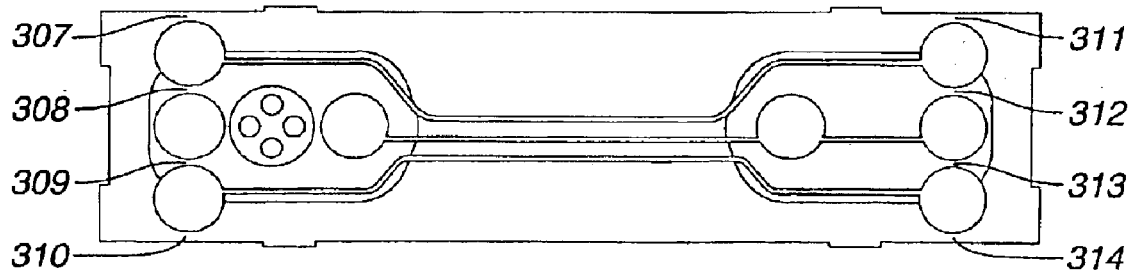
FIG. 7 shows one side of a load cell according to an embodiment of the invention in a view in which joints are indicated with reference numbers.

The flexible joints corresponding to 7–14 formed in the embodiment are shown with reference numbers 307–314 in a separate figure, FIG. 7, for the sake of visual simplicity. The joints are described as flexible in as much as they permit beams such as a side beam 5, 305 and an outer beam 1, 301 connected by a joint 7, 307 to flex towards or away from each other under the influence of an applied load.

Two pairs of shoulders 320, 321 and 322, 323 are shown in FIG. 3 arranged on the two outer beams 301, 304 of the load cell. These shoulders contain means such as threaded holes such as 320a, 320b for mounting the load cell suitably between a support and a device upon which a x-direction component of a load, or the total load if it is acting only in the x-direction, may be measured by the load cell.

Similarly two pairs of shoulders 324–327 are mounted on the side beams 305, 306 of the load cell for mounting the load cell suitably for measuring a y-direction component of a load, or the total load if it is acting only in the y-direction.

Figure 4:
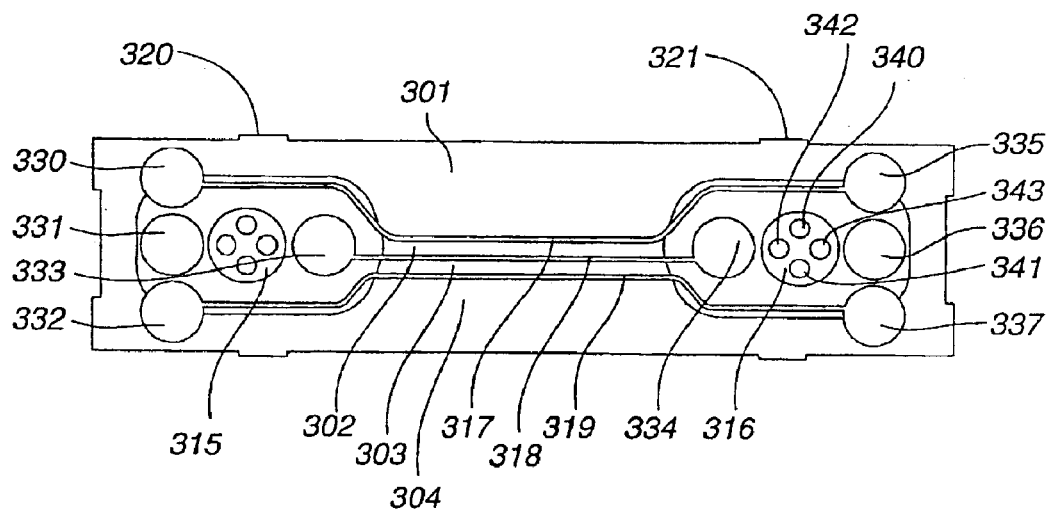
FIG. 4 shows a view of one side of a load cell according to an embodiment of the invention.

Examining one measuring zone in detail, referring to FIG. 4. There are four recesses 330, 332 and 335, 337 arranged such that thin sections of material remain between the recess and the edges of the load cell. These thin sections and those between two separate, adjacent but not connected recesses such as 330, 331, of measuring zone 315, form the mechanical equivalent of joints such as joints 7, 8, 9, 10 of FIG. 1. There are four such joints formed by the recesses 330–332 and 335–337 that surround each measuring area.

The planar gaps such as planar gaps 317–319 shown in FIGS. 3, 4 joining the recesses and defining the measuring zones may be described as plain cuts represented by planes in the z-direction.

A measuring zone 15, 16 in the load cell according to the invention is further shaped in the preferred embodiment such that it is relatively thin in the z-direction in comparison to the thickness of any of the beams 1–6, 301–306. This may be seen in the isometric view of the load cell in FIG. 3. The shaping of the load cell is carried out using a milling process or a water jet abrading process or a combination of those and other suitable processes for accurately removing metal from a solid rectangular block of a suitable metal, for example a type of stainless steel. A measuring means for strain measurement is arranged on the thin part in the load cell that forms the measuring zones 15, 16. The measuring means is preferably a magnetoelastic sensor of the Pressductor type, as indicated in the Figures, in particular in FIG. 4.

The operation of a magnetoelastic sensor of the Pressductor type is based on the fact that the magnetic permeability of a magnetic material changes under mechanical stress. This type of sensor is machined in the material of a measuring zone in a load cell. Primary and secondary windings are each wound in holes in the load cell material so that the windings cross at right angles. Referring to FIG. 4. Two holes in, for example, positions 342, 343 are provided for a primary winding for magnetisation of the material with alternating current. Two more holes in, for example, positions 340, 341 are provided for a secondary winding for measurement of voltages that arise due to an imposed load. The holes for windings in the magnetoelastic sensor of the Pressductor type are indicated with reference numbers in only one example, FIG. 4, for the sake of clarity.

A measuring means for strain measurement may also be arranged on the measuring zone in the form of strain gauges or one or more piezo-electric devices.

In another embodiment of the invention the measuring zones 15, 16 are not reduced in thickness in the z-direction relative to the thickness of any of the beams 1–6, 301–306. In yet another embodiment of the invention, the measuring zones 15, 16 are formed as relatively thick sections that may be thicker in the z-direction than the beams of the load cell. In yet another embodiment of the invention at least one measuring zone is formed as a relatively thin measuring zone of a similar shape but manufactured from a separate piece of material. The at least one separate measuring zone is subsequently fixed in place, for example by welding or bonding, although other known and suitable methods of making a material to material attachment may be used.

Figure 5:
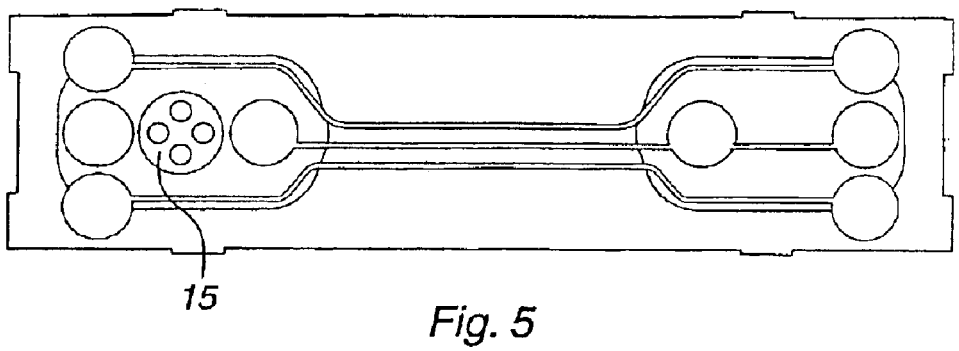
FIG. 5 shows one side of a load cell according to an alternative embodiment of the invention.
Figure 6:
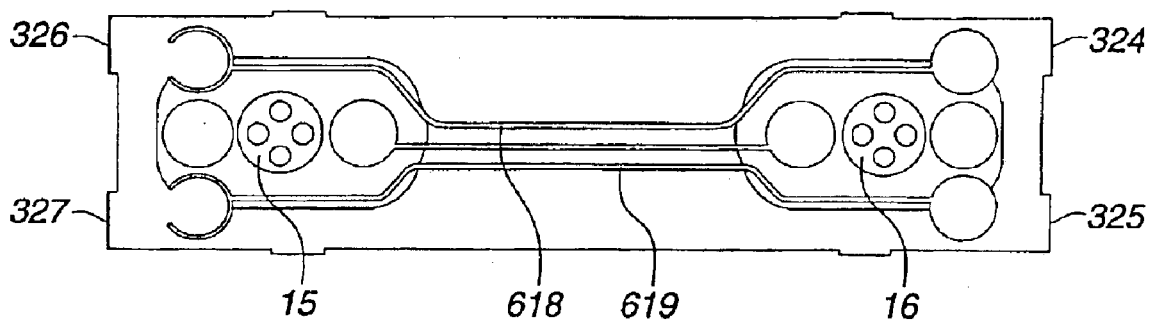
FIG. 6 shows one side of a load cell according to a further alternative embodiment of the invention.
Figure 8:
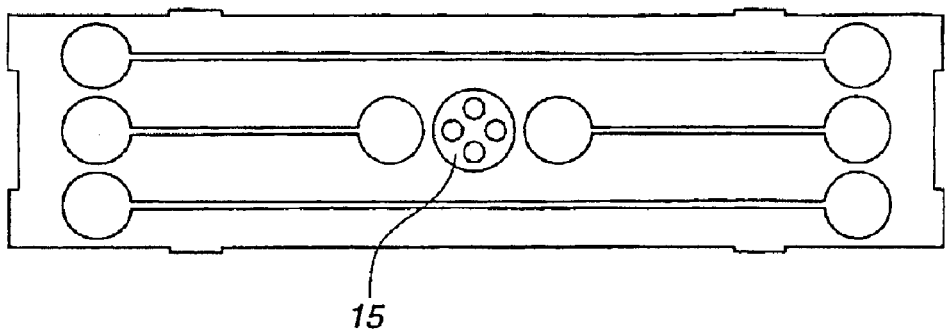
FIG. 8 shows a view of one side of a load cell according to another embodiment of the invention.

An alternative embodiment is shown in FIG. 5, where one single measuring zone 15 is used to measure applied load. A further embodiment with a single measuring zone is shown in FIG. 8. Another embodiment in which the lengths of side beams 5,6 may not be equal may be advantageous in certain applications, for example with embodiments having a single measuring zone, of which two are shown in FIG. 5, 8. Yet another alternative embodiment is shown in FIG. 6. In this embodiment, joints around one measuring zone 15 have been formed by planar gaps 618, 619, instead forming a joint by means of a recess. The planar gaps 618 and 619 correspond to the planar gaps 318, 319 of FIGS. 3 and 4 but in this embodiment have been extended in one part of the load cell to form joints corresponding to joints 7–10 of FIG. 1.

In a development of the invention for use in certain environments, for example severe environments where abrasive dusts or corrosive fluids could come in contact with the load cell, the recesses and planar gaps may be filled with a substance. For example the load cell may be partially coated or completely encapsulated by means of a polymeric or elastomeric coating of, for example, silicone rubber. In this case there is a material present in at least one planar gap or recess which has a modulus of elasticity lower than that of an adjacent beam.

It is within the scope of the claims of the invention that any of the recesses formed by cylindrical openings 330–337 bored through the body of the solid load cell may alternatively have cross sections other than round circles, and/or that the cylindrical openings may have different diameters. One or more recesses may be replaced by a planar gap, or an elongation of an existing planar gap, so forming a joint as indicated in FIG. 6. It is similarly obvious that any of the beams may alternatively have a shape other than that of a straight beam, for example one or more of the two outer beams may be curved or bowed in cross-section and still be equivalent in function to the substantially straight beams shown in the embodiments. It is also within the scope of the claims to substitute one or more mechanical hinges for any of the flexible joints corresponding to joints 7–10 and 11–14 of FIG. 1.

What is claimed is:

1. A load cell comprising a load-carrying structural framework of two essentially parallel rigid beams, arranged essentially parallel to an applied load (f) and at least one measuring zone equipped with means for strain measurement arranged between the two beams, wherein the structural framework comprises two outer beams (1, 4, 301, 304) which are connected by means of joints (7–10, 307–310) to two inner beams (2, 3, 302, 303) by at least two side beams (5, 6, 305, 306) which each extend between said two outer beams and connect to said two outer beams and to said two inner beams, and at least one measuring zone (15, 16, 315, 316) equipped with means for strain measurement is arranged between the two inner beams, and upon an application of a load in an x-direction parallel to the two outer beams, the amount of load applied to said at least one measuring zone (15, 16) is in proportion to a ratio of a distance h between the joints (7 and 10, 11 and 14, 307 and 310, 311 and 314) connecting outer beams (1, 4, 301, 304) to side beams (5, 6, 305, 306) divided by a distance d between the joints (8 and 9, 12 and 13, 308 and 309, 312 and 313) connecting the inner beams (2, 3, 302, 303) to the side beams (5, 6, 305, 306) and said means for strain measurement are suitably adapted such that an output signal representative of the applied load or detected load change is generated.

2. A load cell according to claim 1, wherein at least one joint (7–10, 11–14, 307–310, 311–314) is formed by at least one recess (330–332, 335–337).

3. A load cell according to claim 2, wherein at least one inner beam comprises at least one recess (331, 333, 334, 336).

4. A load cell according to claim 2, wherein at least one recess includes a material with a lower elastic modulus than an adjacent beam.

5. A load cell according to claim 1, wherein the inner beams are joined to each other by said at least one measuring zone.

6. A load cell according to claim 1, wherein the two inner beams are separated from one another along part of their inner length by at least one planar gap (318, 618).

7. A load cell according to claim 1, wherein at least one joint (7–10, 307–310) is formed by at least one planar gap (618, 619).

8. A load cell according to claim 1, wherein at least one said measuring zone further comprises an area of reduced thickness relative to the thickness of any of the beams (1–6, 301–306).

9. A load cell according claim 1, wherein at least one said measuring zone further comprises an area of the same thickness relative to the thickness of any of the beams (1–6, 301–306).

10. A load cell according to claim 9, wherein at least one planar gap includes a material with a lower elastic modulus that an adjacent beam.

11. A load cell according to claim 1, wherein at least one said measuring zone further comprises an area of increased thickness relative to the thickness of any of the beams.

12. A load cell according to claim 1, wherein said measuring means arranged on said measuring zone (15, 16, 315, 316) consists of one or more magnetoelastic sensors.

13. A load cell according to claim 1, wherein said measuring means arranged on said measuring zone (15, 16, 315, 316) consists of one or more magnetoelastic sensors.

14. A load cell according to claim 1, wherein said measuring means consists of one or more piezo-electric devices.

15. The use of a load cell according to claim 1 for measurement of an x-direction component of a load F or the total load when applied in the x-direction.

16. A load cell comprising a load-carrying structural framework of two essentially parallel rigid beams, arranged essentially perpendicular to an applied load (f) and at least one measuring zone equipped with means for strain measurement arranged between the two beams, wherein the structural framework comprises two outer beams (1, 4, 301, 304) which are connected by means of joints (7–10, 307–310) to two inner beams (2, 3, 302, 303) by at least two side beams (5, 6, 305, 306) which each extend between said two outer beams and connect to said two outer beams and to said two inner beams, and at least one measuring zone (15, 16, 315, 316) equipped with means for strain measurement is arranged between the two inner beams, and upon an application of a load in a y-direction parallel to the two side beams, the amount of load applied to said at least one measuring zone (15, 16) is in proportion to a ratio of a distance l between the joints (7 and 11, 10 and 14, 307 and 311, 310 and 314) connecting outer beams (1, 4, 301, 304) to side beams (5, 6, 305, 306) divided by a distance d between the joints (8, and 9, 12 and 13, 308 and 309, 312 and 313) connecting the inner beams (2, 3, 302, 303) to the side beams (5, 6, 305, 306) and said means for strain measurement are suitably adapted such that an output signal representative of the applied load or detected load change is generated.

17. The use of a load cell according to claim 16, for measurement of a y-direction component of a load F or the total load when applied in the y-direction.

* * * * *